United States Patent
Righi et al.

(10) Patent No.: US 9,778,936 B1
(45) Date of Patent: Oct. 3, 2017

(54) BOOTING A COMPUTING SYSTEM INTO A MANUFACTURING MODE

(71) Applicant: American Megatrends Inc., Norcross, GA (US)

(72) Inventors: Stefano Righi, Lawrenceville, GA (US); Madhan B. Santharam, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 67 days.

(21) Appl. No.: 14/657,418

(22) Filed: Mar. 13, 2015

Related U.S. Application Data

(60) Provisional application No. 61/953,267, filed on Mar. 14, 2014.

(51) Int. Cl.
*G06F 9/44* (2006.01)

(52) U.S. Cl.
CPC .................... *G06F 9/4401* (2013.01)

(58) Field of Classification Search
None
See application file for complete search history.

(56) References Cited

U.S. PATENT DOCUMENTS

| | | | | |
|---|---|---|---|---|
| 6,507,906 B1* | 1/2003 | Criddle | ................ | G06F 9/4401 710/10 |
| 2007/0157015 A1* | 7/2007 | Swanson | ............... | G06F 9/4401 713/2 |
| 2009/0037722 A1* | 2/2009 | Chong | ...................... | G06F 1/24 713/2 |
| 2010/0042821 A1* | 2/2010 | Harmer | ................. | G06F 9/4411 713/2 |
| 2013/0067209 A1* | 3/2013 | Hall | ........................ | G06F 9/441 713/2 |
| 2013/0166895 A1* | 6/2013 | Cui | ........................ | G06F 9/4401 713/2 |
| 2014/0122024 A1* | 5/2014 | Chen | ................... | G06F 11/2284 702/184 |

* cited by examiner

*Primary Examiner* — Paul Yanchus, III
(74) *Attorney, Agent, or Firm* — Lee & Hayes, PLLC

(57) ABSTRACT

A system firmware is disclosed that includes a pre-extensible firmware interface initialization (PEI) boot mode module that can determine the presence of a customizable manufacturing mode variable. If the PEI determines that the manufacturing mode variable exists, the computing system may be booted into a manufacturing mode of operation. A computing system booted into a manufacturing mode of operation may be in one of several manufacturing mode states.

20 Claims, 4 Drawing Sheets

BOOTING A COMPUTING SYSTEM INTO A MANUFACTURING MODE

CROSS-REFERENCE TO RELATED APPLICATIONS

This application claims the benefit of provisional U.S. patent application No. 61/953,267, entitled "BOOTING A COMPUTING SYSTEM INTO A MANUFACTURING MODE", which was filed on Mar. 14, 2014, and which is expressly incorporated herein by reference in its entirety.

BACKGROUND

In many computing systems, low-level instruction code, or firmware, is used as an intermediary between the hardware components of the computing system and high-level software executing on the computing system, such as an operating system. The firmware provides a set of software routines that allow high-level software to interact with the hardware components of the computing system using standard calls. In some computer systems, this low-level instruction code is a Basic Input/Output System ("BIOS"). In other systems, the low-level instruction code is an Extensible Firmware Interface ("EFI")-compatible firmware. EFI firmware may also be configured according to a specification released by the Unified EFI ("UEFI") forum (the "UEFI Specification"). Such a firmware is referred to herein as a UEFI compliant or enabled firmware.

Many manufacturers define a special boot mode, called manufacturing mode to enable particular firmware features for use in a manufacturing setting. The manufacturing mode may allow the system to be booted using manufacturing setup defaults. Manufacturing setup defaults include special system configurations for manufacturing purposes, such as the definition of a special boot path. These system configurations enable certain special manufacturing-level BIOS/EFI firmware and system functionality needed by platform and system manufacturers. The functionality enabled by the special system configurations are vendor and project specific. In UEFI systems, the boot mode is examined in a firmware phase called pre-EFI initialization (PEI) in order to determine whether the boot mode is set to the manufacturing mode or to a different mode. Different PEI and driver execution environment (DXE) drivers take different execution paths and perform certain special operations depending on the current value of the boot mode.

It is with respect to these and other considerations that the disclosure made herein is presented.

SUMMARY

Technologies are described herein for booting a computing system into a manufacturing mode of operation. Through the utilization of the technologies and concepts presented herein, a UEFI compliant firmware can enable a computing system to boot into a manufacturing mode in a platform-independent manner with little or no affect to boot times, without requiring special key presses during specific windows of time during each boot sequence, or not requiring physical manipulation of the hardware configuration.

According to one aspect presented herein, a system firmware is disclosed that includes a PEI boot mode module that can determine the presence of a customizable manufacturing mode variable. If the PEI determines that the manufacturing mode variable exists, the computing system may be booted into a manufacturing mode of operation.

According to another aspect disclosed herein, a computing system that has been booted in a manufacturing mode of operation may be in one of various manufacturing mode states including a "physical presence" state, a "boot to manufacturing mode once" state, and a "boot to manufacturing mode until disabled" state. In yet another example, an operating system utility and a secure manufacturing server may be used in conjunction with public and private keys to restrict use of the manufacturing mode to a manufacturing environment.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
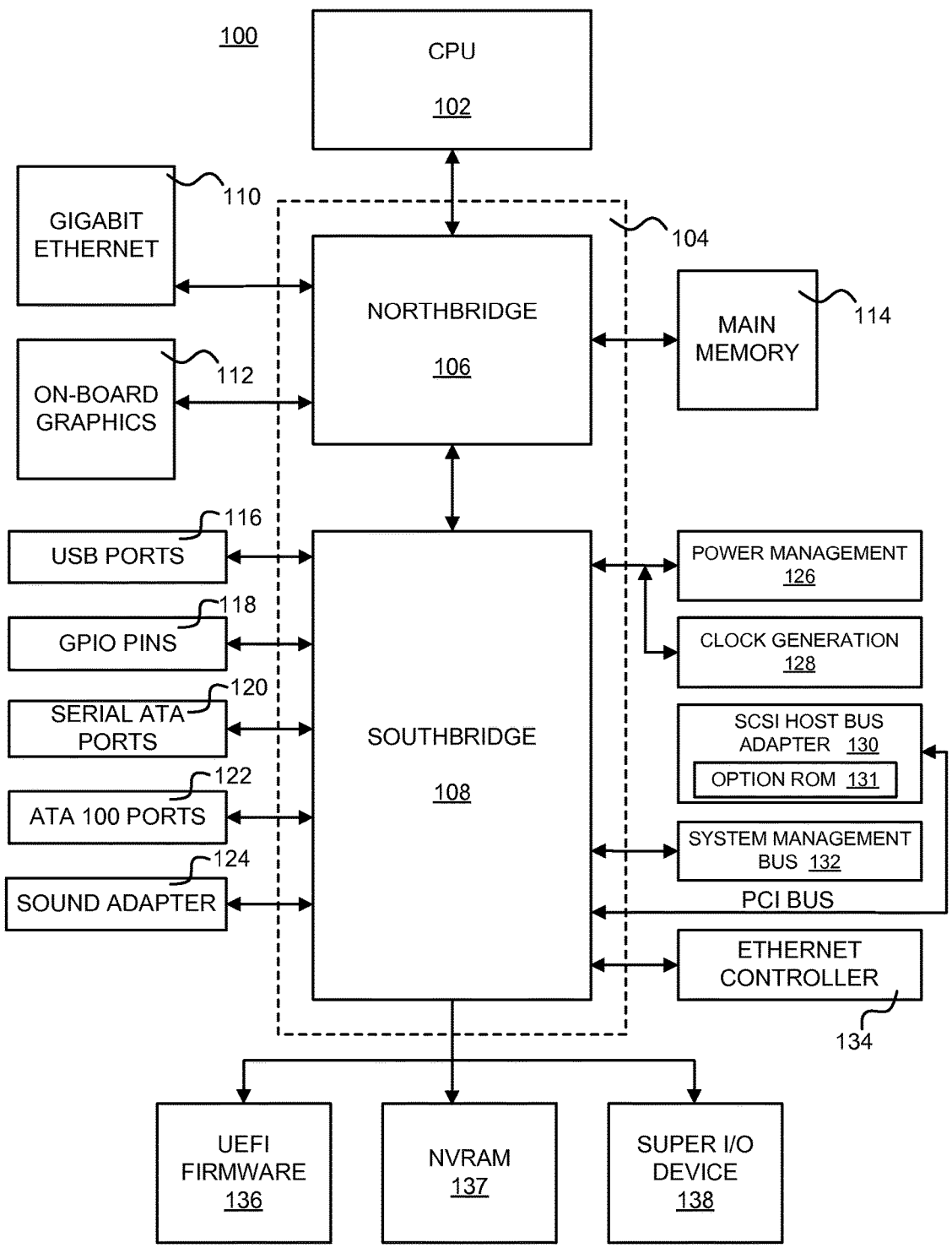
FIG. 1 is a computer architecture diagram that illustrates various components of a computer that provides an illustrative operating environment for the implementations presented herein.

Examples of the disclosure presented herein provide methods, systems, apparatuses, and computer-readable media for booting a computing system into a manufacturing mode of operation. Booting a computing system into a manufacturing mode of operation may allow for the computing system to be configured in situations when no console is available for the computing system, such as in a manufacturing setting or a server farm. Rather than developing separate utilities for each specific operating system and/or platform, the disclosures presented herein may allow for the configuration of a computing system platform to be reviewed and modified through a standard interface such as HTTP. Through the standard interface, the computing system may receive a command to restart the platform. During a pre-boot phase upon restarting, the computing system may listen for a request to enter one of several manufacturing mode states. Upon receiving the request, the computing system may enter one of the states of the manufacturing mode of operation.

In the following detailed description, references are made to the accompanying drawings that form a part hereof, and in which are shown by way of illustration specific examples. Referring now to the drawings, in which like numerals represent like elements throughout the several figures, aspects of an exemplary operating environment and the implementations provided herein will be described.

FIG. 1 and the following discussion are intended to provide a brief, general description of a suitable computing environment in which examples presented herein may be implemented. While the examples presented herein are described in the general context of program modules that execute in conjunction with the execution of a computer firmware, those skilled in the art will recognize that various examples may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, embedded systems, and the like. Examples presented herein may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the examples discussed herein will be described. It should be appreciated that although the examples described herein are discussed in the context of a conventional desktop or server computer, the examples may be utilized with virtually any type of computing device. FIG. 1 shows an illustrative computer architecture for a computing system 100 that is operative to boot in manufacturing mode.

In order to provide the functionality described herein, the computing system 100 can include a baseboard, or motherboard. The motherboard can be a printed circuit board to which a multitude of components or devices may be connected by way of a system bus or other electrical communication path. In one illustrative example, a central processing unit ("CPU") 102 can operate in conjunction with a chipset 104. The CPU 102 may be a standard central processor that performs arithmetic and logical operations necessary for the operation of the computing system.

The chipset 104 includes a northbridge 106 and a southbridge 108. The northbridge 106 provides an interface between the CPU 102 and the remainder of the computing system 100. The northbridge 106 also provides an interface to a random access memory ("RAM") used as the main memory 114 in the computing system 100 and, possibly, to an on-board graphics adapter 112. The northbridge 106 may also include functionality for providing networking functionality through a gigabit Ethernet adapter 110. The gigabit Ethernet adapter 110 is capable of connecting the computing system 100 to another computer via a network. Connections that may be made by the Ethernet adapter 110 may include local area network ("LAN") or wide area network ("WAN") connections. LAN and WAN networking environments are commonplace in offices, enterprise-wide computer networks, intranets, and the Internet. The northbridge 106 is connected to the southbridge 108.

The southbridge 108 is responsible for controlling many of the input/output functions of the computing system 100. In particular, the southbridge 108 may provide one or more universal serial bus ("USB") ports 116, a sound adapter 124, an Ethernet controller 134, and one or more general purpose input/output ("GPIO") pins 118. The southbridge 108 may also provide a bus for interfacing peripheral card devices such as a BIOS boot system-compliant SCSI host bus adapter 130. In one example, the bus comprises a peripheral component interconnect ("PCI") bus. The southbridge 108 may also provide a system management bus 132 for use in managing the various components of the computing system 100. Power management circuitry 126 and clock generation circuitry 128 may also be utilized during the operation of the southbridge 108.

The southbridge 108 is also operative to provide one or more interfaces for connecting mass storage devices to the computing system 100. For instance, according to an example, the southbridge 108 includes a serial advanced technology attachment ("SATA") adapter for providing one or more SATA ports 120 and an ATA100 adapter for providing one or more ATA100 ports 122. The SATA ports 120 and the ATA100 ports 122 may be, in turn, connected to one or more mass storage devices storing an operating system and application programs. As known to those skilled in the art, an operating system comprises a set of programs that control operations of a computing system and allocation of resources. An application program is software that runs on top of the operating system software and uses computer resources made available through the operating system to perform application specific tasks desired by the user.

The mass storage devices connected to the southbridge 108 and the SCSI host bus adapter 130, and their associated computer-storage media, provide non-volatile storage for the computing system 100. Although the description of computer-storage media contained herein refers to a mass storage device, such as a hard disk or CD-ROM drive, it should be appreciated by those skilled in the art that computer-storage media can be any available non-transitory media that can be accessed by the computing system 100. Computer storage media may include volatile and non-volatile, removable and non-removable media implemented in any method or technology for the non-transitory storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computing system.

A low pin count ("LPC") interface may also be provided by the southbridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a computer storage media such as a ROM or a flash memory such as a non-volatile random access memory ("NVRAM") for storing the firmware 136 that includes program code containing the basic routines that help to start up the computing system 100 and to transfer information between elements within the computing system 100. In one example, the firmware 136 is a firmware that is compatible with the UEFI Specification. The LPC interface may also be utilized to connect a NVRAM 137 to the computing system 100. The NVRAM 137 may be utilized by the firmware 136 to store configuration data for the computing system 100. The configuration data for the computing system 100 may also be stored on the same NVRAM 137 as the firmware 136.

The computing system 100 may be implemented as a conventional computer system, an embedded control computer, a laptop, or a server computer, a mobile device, a set-top box, a kiosk, a vehicular information system, a mobile telephone, a customized machine, or other hardware platform. The CPU 102 may be a general purpose processor, a processor core, a multiprocessor, a multi-core processor, a graphics processor, a digital signal processing ("DSP") processor, a customized computing device implemented within an application specific integrated circuit ("ASIC"), a customized computing device implemented within a field programmable gate array ("FPGA"), a customized computing device implemented within any type of programmable logic, a state machine, a reconfigurable processor, any other processing unit, or any combination or multiplicity thereof.

It should be appreciated that the program modules disclosed herein, including the firmware 136, may include software instructions that, when loaded into the CPU 102 and executed, transform a general-purpose computing system into a special-purpose computing system 100 customized to facilitate all, or part of, the operations disclosed herein. As detailed throughout this description, the program modules may provide various tools or techniques by which the computing system 100 may participate within the overall systems or operating environments using the components, logic flows, and/or data structures discussed herein.

The CPU 102 may be constructed from any number of transistors or other circuit elements, which may individually or collectively assume any number of states. More specifically, the CPU 102 may operate as a state machine or finite-state machine. Such a machine may be transformed to a second machine, or a specific machine, by loading executable instructions contained within the program modules. These computer-executable instructions may transform the CPU 102 by specifying how the CPU 102 transitions between states, thereby transforming the transistors or other circuit elements constituting the CPU 102 from a first machine to a second machine, wherein the second machine may be specifically configured to perform the operations disclosed herein. The states of either machine may also be transformed by receiving input from one or more user input devices, network interfaces 110, 134, other peripherals, other interfaces, or one or more users or other actors. Either machine may also transform states, or various physical characteristics of various output devices such as printers, speakers, video displays, or otherwise.

Encoding the program modules may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules may transform the physical state of the semiconductor memory 114, 136, 137 when the software or firmware 136 is encoded therein. For example, the software may transform the state of transistors, capacitors, or other discrete circuit elements constituting the semiconductor memory.

As another example, the storage media may be implemented using magnetic or optical technology such as hard drives or optical drives. In such implementations, the program modules may transform the physical state of magnetic or optical media, when the software is encoded therein. These transformations may include altering the magnetic characteristics of particular locations within given magnetic media. These transformations may also include altering the physical features or characteristics of particular locations within given optical media to change the optical characteristics of those locations. It should be appreciated that various other transformations of physical media are possible without departing from the scope and spirit of the present description.

It should be appreciated that the computing system 100 may comprise other types of computing devices, including hand-held computers, embedded computer systems, personal digital assistants, and other types of computing devices known to those skilled in the art. It is also contemplated that the computing system 100 may not include all of the components shown in FIG. 1, may include other components that are not explicitly shown in FIG. 1, or may utilize an architecture completely different than that shown in FIG. 1.

Figure 2:
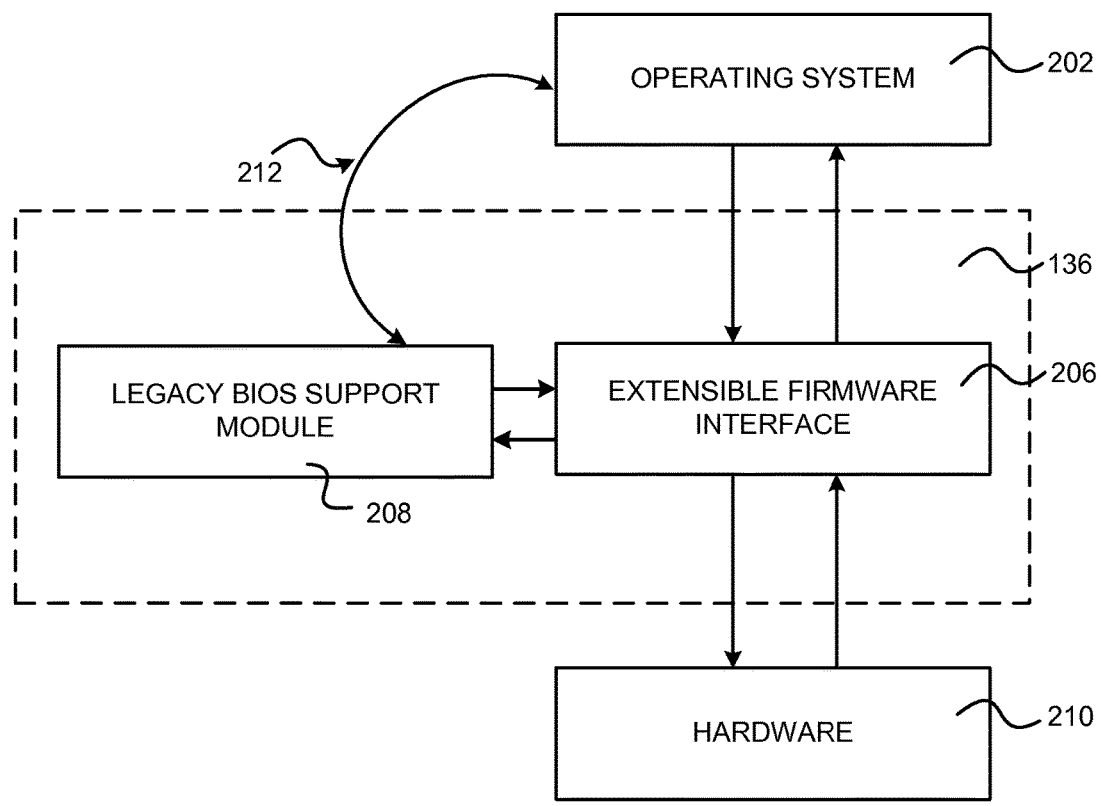
FIG. 2 is a block diagram illustrating aspects of an interface between a UEFI specification-compliant firmware and an operating system according to one or more examples presented herein.

Referring now to FIG. 2, a block diagram illustrates aspects of an interface between a UEFI firmware 136 and an operating system 202 according to one or more examples presented herein. As described with respect to FIG. 1, the firmware 136 may comprise a firmware compatible with the UEFI Specification (which may be referred to herein as the "Specification") from INTEL CORPORATION or from the UEFI FORUM. The UEFI Specification describes an interface between the operating system 202 and the system firmware 136. The UEFI Specification also defines an interface that platform firmware may implement, and an interface that the operating system 202 may use while booting. How the firmware 136 implements the interface may be left up to the manufacturer of the firmware. The Specification can define a way for the operating system 202 and firmware 136 to communicate information necessary to support the operating system boot process.

According to some examples, both a UEFI-compatible firmware 206 and a legacy BIOS support module 208 may be present in the UEFI firmware 136. This allows the computing system 100 to support a UEFI firmware interface and a legacy BIOS firmware interface. In order to provide this functionality, an interface 212 may be provided for use by legacy operating systems and applications. According to other examples, only one of the UEFI-compatible firmware 206 and the legacy BIOS support module 208 may be present in the firmware 136. According to yet other examples, the firmware 136 may interface with the hardware 210 through any of various other architectures, components, or modules for the firmware without specific involvement of the UEFI-compatible firmware 206 or the legacy BIOS support module 208.

Additional details regarding the operation and architecture of a UEFI Specification compliant-firmware can be found in the UEFI Specification and in the specifications that make up the EFI Framework, both of which are available from INTEL CORPORATION and are expressly incorporated herein by reference.

Figure 3:
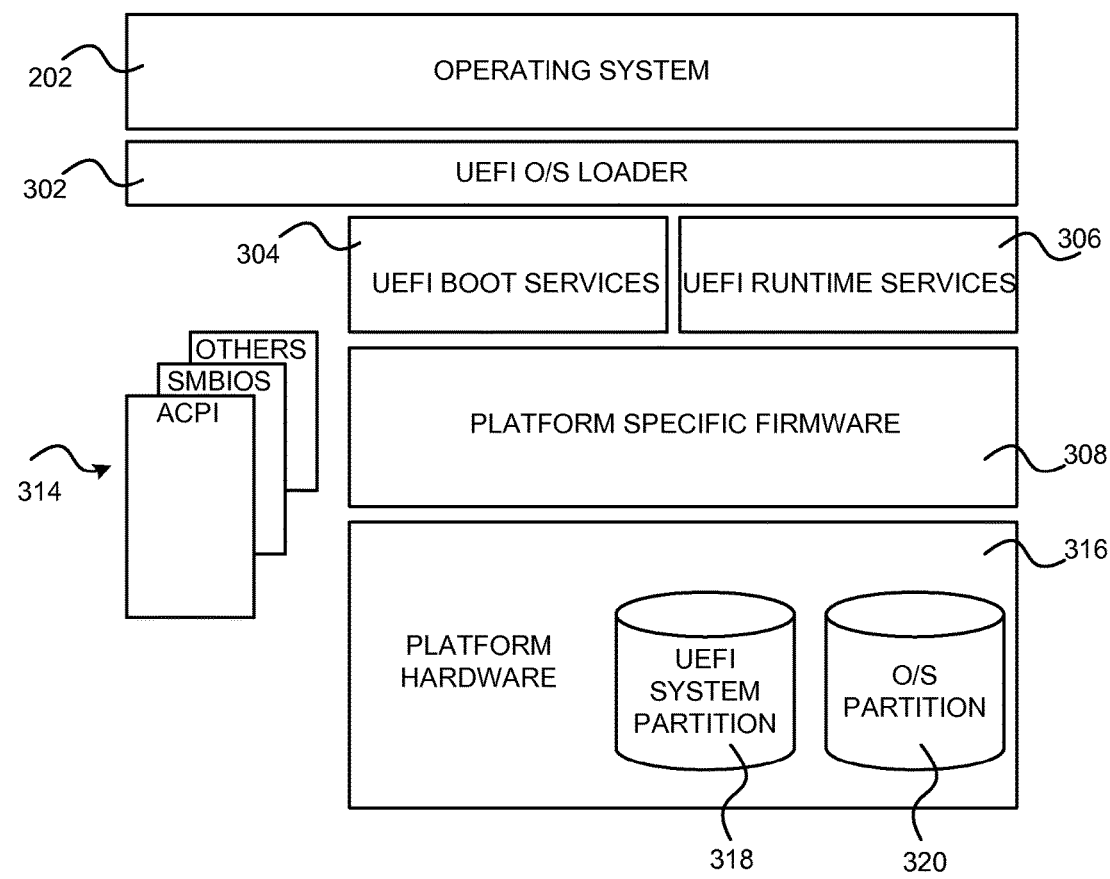
FIG. 3 is a block diagram illustrating an architecture for a UEFI specification-compliant firmware that provides an operating environment for one or more examples presented herein.

Turning now to FIG. 3, a block diagram illustrates the architecture for a UEFI specification-compliant firmware that provides an operating environment for one or more examples presented herein. As shown in FIG. 3, the architecture can include platform hardware 316 and an operating system 202. The platform specific firmware 308 may retrieve an operating system ("OS" or "O/S") image from a UEFI system partition 318 using an UEFI operating system loader 302. The UEFI system partition 318 may be an architecturally shareable system partition. As such, the UEFI system partition 318 can define a partition and file system designed to support safe sharing of mass storage between multiple vendors. An OS partition 320 may also be utilized.

Once started, the UEFI OS loader 302 may continue to boot the complete operating system 202. In doing so, the UEFI OS loader 302 may use UEFI boot services 304 and interface to other supported specifications to survey, comprehend, and initialize the various platform components and the operating system software that manages them. Thus, interfaces 314 from other specifications may also be present on the system. For example, the Advanced Configuration and Power Management Interface ("ACPI") and the System Management BIOS ("SMBIOS") specifications may be supported.

UEFI boot services 304 may provide interfaces for devices and system functionality used during boot time. UEFI runtime services 306 may also be available to the UEFI OS loader 302 during the boot phase. For example, a set of runtime services may be presented to ensure appropriate abstraction of base platform hardware resources used by the operating system 202 during its operation. UEFI allows extension of platform firmware by loading UEFI driver and UEFI application images which, when loaded, have access to UEFI-defined runtime and boot services.

Various program modules can provide the boot-time and run-time services. These program modules may be loaded by the UEFI OS loader 302 at system boot time. The UEFI OS loader 302 determines which program modules should be explicitly loaded and when. Once the UEFI firmware is initialized, it passes control to the UEFI OS loader 302. The UEFI OS loader 302 may then determine which of the program modules to load and in what order.

In some examples, a user may physically interact with a computing system in order to enable booting into a manufacturing mode. For instance, a pre-EFI initialization (PEI) boot mode module may determine during the PEI phase, based on a particular GPIO jumper setting or hotkey press made by the user, whether or not the computing system 100 should be booted in manufacturing mode. The PEI phase may be entered during the boot process, prior to the loading of the operating system 202. Because the determination occurs during the PEI phase, the firmware may not need to perform a complete boot to a UEFI shell or operating system prior to entering manufacturing mode. Therefore, in some examples, even if the computing system 100 becomes non-bootable because of a conflict in setup data, an operating system crash, or because an operating system 202 has not been installed, the manufacturing mode of operation can still be utilized.

In some instances, a physical interaction from a user is required before the computing system 100 is booted into a manufacturing mode. Requiring the user's physical presence may help avoid end-user attacks on the computing system 100. In an end user attack, an unauthorized third party may remotely execute a command to put the computing system 100 into manufacturing mode, leaving the computing system 100 exposed for further unauthorized actions. Because a user must intervene before the command is executed, an automated end user attack on the computing system 100 may be avoided.

According to various other examples, a computing system 100 can be booted into manufacturing mode entirely through functionality provided by the firmware. For example, the PEI boot mode module may be modified to check for an indication to enter a manufacturing mode. In at least one instance, a customizable manufacturing mode variable stored in a non-volatile memory, such as NVRAM 137, may serve as such an indication. The manufacturing mode variable may have a predetermined name and a platform identifier, such as a GUID, that can be uniquely set for a given implementation, so that a specific platform and/or product can be uniquely differentiated from all other platforms and/or products. The manufacturing mode variable may also store additional values or attributes.

In some examples, if the PEI boot mode module determines that a manufacturing mode has been enabled (i.e., an indication such as a manufacturing mode variable having the predetermined name has been set with the correct GUID), the boot mode can be set to the manufacturing mode of operation. If the PEI boot mode module determines that manufacturing mode has not been enabled, the boot process may proceed as normal.

A manufacturing control method variable may also be stored in NVRAM 137. The manufacturing control method variable may be stored with, or as a component of, the indication to enter a manufacturing mode. The manufacturing control method variable may be used to determine which one of several manufacturing mode states will be entered. In various implementations, the manufacturing mode states may include "physical presence," "boot to manufacturing mode once," and "boot to manufacturing mode until disabled." If the PEI boot module determines that a manufacturing mode variable having the predetermined name has been set with the correct GUID, but no manufacturing control method is found, a default manufacturing mode state may be entered. It should be appreciated that, according to implementations, instead of being stored as a separate variable, the indication of the desired manufacturing control method could be stored as an additional attribute of the manufacturing mode variable.

According to various implementations, the "physical presence" state may require an affirming keypress (e.g., 'Y' for Yes) or a negating keypress, (e.g., 'N' for No) to be made indicating whether the manufacturing mode will be enabled. In some instances, the computing system may request the keypress by way of a user interface presented on a video display. An affirming keypress may result in the manufacturing mode being enabled during the current boot, during the power-on self-test (POST) for example, and for any subsequent boots until the mode has been disabled. A negating keypress may result in the manufacturing mode being disabled (i.e., ensuring that no manufacturing mode variable having the predetermined name and GUID will be found).

In other examples, a one-time "boot to manufacturing mode once" state may cause the computing system 100 to boot into a manufacturing mode, then delete the manufacturing mode variable. In yet other examples, the "boot to manufacturing mode until disabled" state may cause the computing system 100 to boot to manufacturing mode until the manufacturing mode is disabled by an operating system utility which will now be described in further detail.

According to various implementations, a utility program may be provided to manipulate the manufacturing mode variable in NVRAM 137 from the operating system 202. The utility may enable a platform vendor to decide who needs the ability to enable or disable the manufacturing mode and when. The utility program may be used with a script file to set or clear the manufacturing mode variable, therefore enabling or disabling the manufacturing mode.

In some examples where the computing system 100 may be booted into the manufacturing mode of operation entirely through the BIOS; the cabinet or chassis of the computing system 100 does not need to be opened in order to manipulate jumper settings. A system that utilizes GPIO jumper settings requires platform design and porting, making each implementation is platform-specific. The ability to enable and disable the manufacturing mode through the BIOS saves the design time expended developing platform-specific implementations and the manufacturing time expended opening and manipulating jumper settings; therefore, it is a more efficient and cost-effective solution than other options.

Booting a computing system 100 into manufacturing mode through the BIOS may avoid the strict timing requirements necessary to press hotkeys during the POST or other boot phases. A user is also not required to press a hotkey on each boot. Therefore, booting a computing system 100 into manufacturing mode through the BIOS is a more flexible option for a manufacturing environment than other options.

In various examples, the ability to enter the manufacturing mode can be restricted to a particular environment, such as a manufacturing facility, by using public key infrastructure (PKI). The utility program described above may be used to write a data blob that has been signed by a private key made available only within the specific manufacturing facility. The key may be hosted by an on-site secure manufacturing server.

In some examples, a platform identifier, such as the GUID, or any other platform-specific information, may be read from the platform that needs to be set in manufacturing mode. The platform identifier may then be sent to the secure manufacturing server hosting the private key so that the platform identifier may be signed. The signed data blob may then be used by the utility program described above to set the manufacturing mode variable, enabling the manufacturing mode. Upon booting, the BIOS may evaluate the data blob with the corresponding public key to validate that the data blob has truly been signed on-site by the secure manufacturing server. In some examples, once this signature evaluation has been done, the time required for each subsequent manufacturing reboot may be reduced by writing a second variable using the AMISCE. Because the second variable may only be written after the signature evaluation, the existence of the second variable may serve as a proxy for the signature evaluation process.

Figure 4:
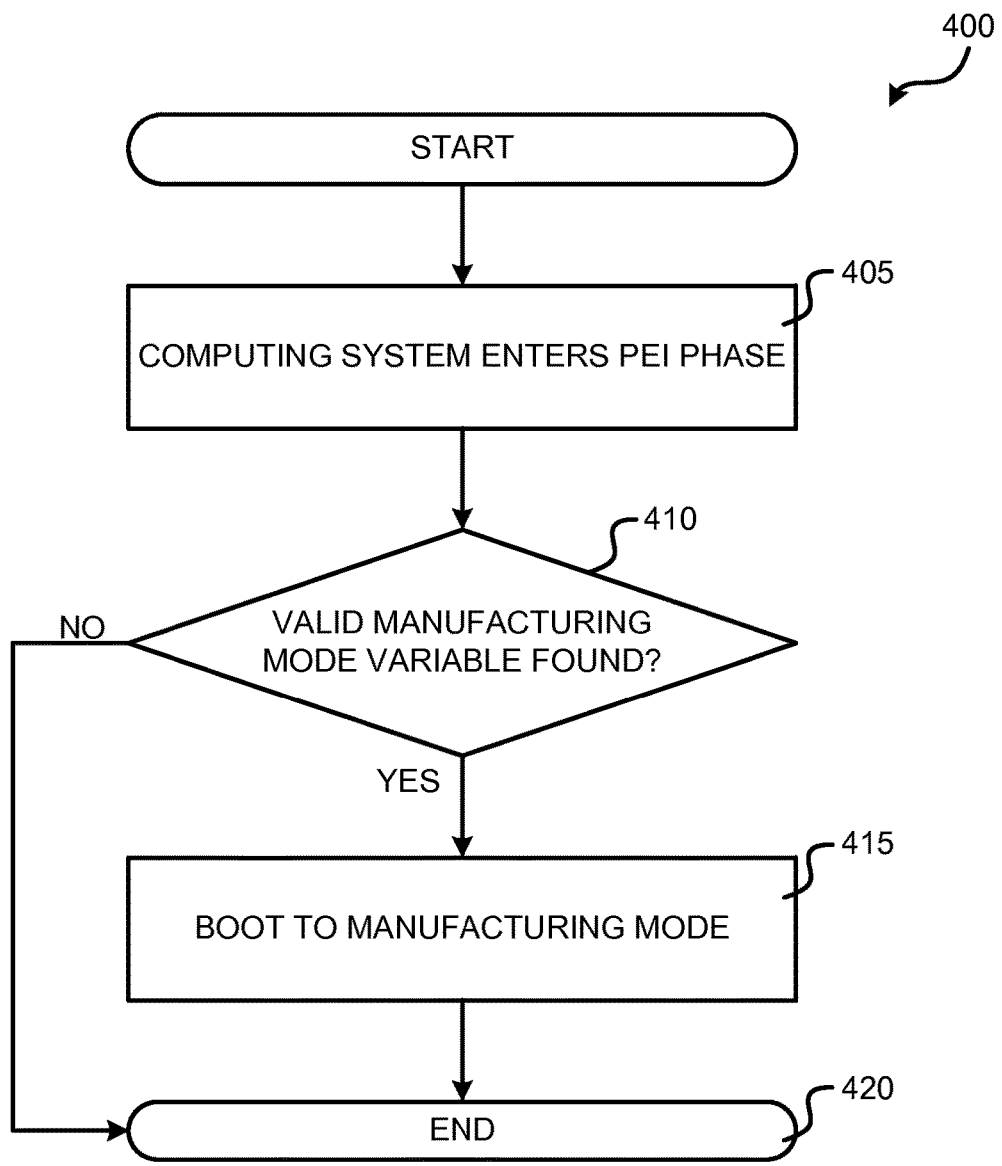
FIG. 4 is a flow diagram showing a routine that illustrates aspects of a process for booting a computing system into a manufacturing mode according to examples presented herein.

Referring now to FIG. 4, a flow diagram showing a routine 400 that illustrates aspects of a process for booting a computing system 100 into a manufacturing mode according to examples presented herein will be described. The process illustrated in FIG. 4 may be performed by various components that make up the UEFI firmware 136 shown in FIG. 3.

It should be appreciated that the logical operations described herein are implemented (1) as a sequence of computer implemented acts or program modules running on a computing system 100 and/or (2) as interconnected machine logic circuits or circuit modules within the computing system 100. The implementation is a matter of choice dependent on the performance and other requirements of the computing system 100. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 400 begins at operation 405, where an indication to enter a manufacturing mode may be stored. In some instances, the indication may be received from a server operating in a manufacturing facility. In some examples, the indication may be received and stored by a utility program executing within the operating system 202 of the computing system 100. The indication may be stored in a non-volatile memory such as the NVRAM 137.

From operation 405, the routine 400 may proceed to operation 410 where a PEI boot mode module may determine whether a valid indication has been stored. As discussed above, the PEI boot mode module may execute during a pre-boot PEI phase. A valid indication may have a predetermined name and GUID. In various examples, determining the validity of an indication may include using a public key to evaluate a data blob containing a platform identifier that has been signed with a corresponding private key.

Upon determining that a valid indication has not been found, the routine 400 may proceed from operation 410 to operation 420, where the routine 400 ends. If the PEI boot mode module determines at operation 410 that a valid indication has been found, the routine 400 may proceed to operation 415 where the computing system 100 may be booted to a manufacturing mode. According to various implementations, the computing system 100 may be booted into one of several manufacturing mode states. The value of a manufacturing control method variable may be used to determine which of the manufacturing mode states the computing system 100 may be booted into. In some instances, the computing system 100 may be booted into a default manufacturing mode state if no manufacturing control method variable is found. From operation 415, the routine 400 may proceed to operation 420 where the routine 400 ends.

It should be appreciated that, according to implementations, the mechanism disclosed herein may allow a computing system 100 to be booted to a manufacturing mode of operation in a platform-independent manner without affecting boot times, requiring special key presses during specific windows of time during each boot sequence, or requiring physical manipulation of the hardware. The mechanism disclosed herein may further allow structural safeguards to ensure that the manufacturing mode of operation may only be activated in a specified environment, such as a manufacturing facility. It should be appreciated that this example is only illustrative and is not intended to limit the technology provided herein to any particular performance improvement percentage.

Based on the foregoing, it should be appreciated that technologies for booting a computing system 100 into a manufacturing mode of operation have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the examples and applications illustrated and described, and without departing from the true spirit and scope of the present invention, which is set forth in the following claim.

We claim:

1. A computer-implemented method for booting a computing system into a manufacturing mode, comprising:
    storing a value corresponding to a particular state of a plurality of booting mode states, the plurality of booting modes states including a plurality of manufacturing modes;
    determining, by way of firmware executing on the computing system during a pre-extensible firmware interface (PEI) phase, that the value has been stored; and
    booting the computing system into a particular manufacturing mode of the plurality of the manufacturing modes in response to determining that the value has been stored.

2. The method of claim 1, wherein the value is stored as a variable having a predetermined name and a platform identifier.

3. The method of claim 1, further comprising:
    determining that the particular manufacturing mode is where a user is required to press one or more specific keys to enable the manufacturing mode;
    determining that the user has pressed the one or more specific keys; and
    in response to determining that the user has pressed the one or more specific keys, booting the computing system into the particular manufacturing mode.

4. The method of claim 1, further comprising:
    determining that the particular manufacturing mode is where the value is to be deleted after booting the computer system into the particular manufacturing mode; and
    in response to determining that the value is to be deleted after booting the computer system into the particular manufacturing mode, deleting the value after booting the computer system into the particular manufacturing mode.

5. The method of claim 1, wherein the value comprises a data blob including a platform identifier signed with a private key of a server, the server being located at a manufacturing facility.

6. The method of claim 1, wherein booting the computing system into the particular manufacturing mode comprises:
    determining a validity of a data blob comprising a platform identifier signed by a private key by evaluating the data blob using a corresponding public key; and
    in response to determining the validity of the data blob, booting the computing system into the manufacturing mode.

7. A computer-readable storage medium having computer-executable instructions stored thereupon which, when executed by the computer, cause the computer to:
    determine, by way of firmware executing on the computer during a pre-extensible firmware interface (PEI) phase, whether an indication to enter a particular state of a plurality of booting mode states has been stored; and
    boot the computer into a particular manufacturing mode of a plurality of manufacturing modes in response to determining that the indication corresponds to the particular manufacturing mode.

8. The computer-readable storage medium of claim 7, wherein determining that the indication has been stored comprises confirming the existence of a manufacturing mode variable in a non-volatile memory, the manufacturing mode variable comprising a predetermined name and a platform identifier.

9. The computer-readable storage medium of claim 8, wherein booting the computer into the particular manufacturing mode comprises:
    determining that a manufacturing control method variable has been stored with the manufacturing mode variable; and
    booting the computer into the particular manufacturing mode based, at least partly, on a value of the manufacturing control method variable.

10. The computer-readable storage medium of claim 9, wherein the computer-executable instructions stored thereupon further cause the computer to:
    determine that the particular state is a state where a user is required to press one or more specific keys to enable the particular manufacturing mode;
    determine that the user has pressed the one or more specific keys; and
    in response to determining that the user has pressed the one or more specific keys, boot the computer into the particular manufacturing mode.

11. The computer-readable storage medium of claim 9, wherein the computer-executable instructions stored thereupon further cause the computer to:
    determine that the particular state is a one-time state where the manufacturing mode variable is deleted after booting the computer into the particular manufacturing mode; and
    in response to determining that the particular state is the one-time state, delete the manufacturing mode variable after booting the computer into the particular manufacturing mode.

12. The computer-readable storage medium of claim 9, wherein the computer-executable instructions stored thereupon further cause the computer to:
    determine that the manufacturing control method variable has not been set; and
    in response to determining that the manufacturing control method variable has not been set, boot the computer into a default one of the plurality of manufacturing mode states.

13. The computer-readable storage medium of claim 7, wherein the computer-executable instructions stored thereupon further cause the computer to:
    receive the indication from a server located at a manufacturing facility, the indication comprising a platform identifier signed with a private key located on the server; and
    wherein booting the computer into the particular manufacturing mode comprises booting the computer into the particular manufacturing mode in response to validating the indication using a public key.

14. An apparatus, comprising:
    a processor; and
    a computer-readable storage medium having computer-executable instructions stored thereupon which, when executed by the processor, cause the apparatus to
        determine, by way of firmware executing on the apparatus during a pre-extensible firmware interface (PEI) phase, that an indication to enter a particular one of a plurality of manufacturing modes has been stored, wherein the indication corresponds to a particular state of a plurality of booting mode states, and boot the apparatus into the particular manufacturing mode of the plurality of the manufacturing modes in response to determining that the indication has been stored.

15. The apparatus of claim 14, wherein determining that the indication has been stored comprises confirming the existence of a manufacturing mode variable in a non-volatile memory.

16. The apparatus of claim 14, wherein booting the apparatus into the manufacturing mode comprises
   determining that a manufacturing control method variable has been stored with the indication; and
   booting the apparatus into the particular state based, at least partly, on a value of the manufacturing control method variable.

17. The apparatus of claim 16, further comprising computer-executable instructions that cause the apparatus to:
   determine that the particular state is a state where a user is required to press one or more specific keys to enable the particular manufacturing mode;
   determine that the user has pressed the one or more specific keys; and
   in response to determining that the user has pressed the one or more specific keys, boot the apparatus into the manufacturing mode.

18. The apparatus of claim 16, further comprising computer-executable instructions that cause the apparatus to:
   determine that the particular state is a one-time state where the manufacturing mode variable is deleted after booting; and
   in response to determining that the particular state is the one-time state, delete the manufacturing mode variable after booting the apparatus into the particular manufacturing mode.

19. The apparatus of claim 16, further comprising computer-executable instructions that cause the apparatus to:
   determine that the manufacturing control method variable has not been set; and
   in response to determining that the manufacturing control method variable has not been set, boot the apparatus into a default one of the plurality of manufacturing mode states.

20. The apparatus of claim 14, further comprising computer-executable instructions that cause the apparatus to:
   validate the indication using a public key, wherein booting the computer into the particular manufacturing mode is based at least in part on validating the indication.

* * * * *